United States Patent [19]

Schapiro, deceased et al.

[11] Patent Number: 4,507,328

[45] Date of Patent: * Mar. 26, 1985

[54] INSTANTIZED MIXTURE OF SOYA PROTEIN AND CASEINATE

[76] Inventors: Abraham Schapiro, deceased, late of Kentfield, Calif.; Mable S. Schapiro, executor, P.O. Box 548, Kentfield, Calif. 94904

[*] Notice: The portion of the term of this patent subsequent to Jun. 24, 1997 has been disclaimed.

[21] Appl. No.: 118,452

[22] Filed: Feb. 4, 1980

Related U.S. Application Data

[63] Continuation-in-part of Ser. No. 895,356, Apr. 11, 1978, Pat. No. 4,209,545, Ser. No. 851,710, Nov. 15, 1977, abandoned, Ser. No. 726,612, Sep. 27, 1976, abandoned, Ser. No. 430,230, Jan. 2, 1974, Pat. No. 3,988,511, and Ser. No. 156,040, Jun. 23, 1971, abandoned.

[51] Int. Cl.³ .................... A23J 3/00; A23L 1/20; A23C 23/00
[52] U.S. Cl. .................... 426/580; 426/634; 426/657
[58] Field of Search ............ 426/580, 588, 657, 579, 426/634

[56] References Cited

U.S. PATENT DOCUMENTS

| | | | |
|---|---|---|---|
| 3,728,127 | 4/1973 | Palmer | 426/580 X |
| 3,988,511 | 10/1976 | Schapiro | 426/580 |
| 4,025,659 | 5/1977 | Cho et al. | 426/657 X |
| 4,209,545 | 6/1980 | Schapiro | 426/580 |

*Primary Examiner*—David M. Naff
*Attorney, Agent, or Firm*—Edward B. Gregg

[57] ABSTRACT

An instantized blend of a major amount of a caseinate (sodium, calcium or a mixture of the two) and a minor amount of a soya protein is prepared. The soya protein is pre-instantized by blending with a surfactant such as lecithin, preferably by an incremental process in which a small amount of the soya protein is blended with the surfactant and the balance of the soya protein is added in small increments and blended before the next increment is added. The resulting pre-instantized soya protein is then blended with the caseinate by adding the latter to the soya protein in small increments with blending of each increment before the next increment is added. The instantized blend contains more than 75% caseinate and less than 25% but not less than 0.5% soya protein based on the quantity of soya protein and caseinate present.

9 Claims, No Drawings

INSTANTIZED MIXTURE OF SOYA PROTEIN AND CASEINATE

This application is a continuation-in-part of the following copending applications: Ser. No. 156,040, filed June 23, 1971, now abandoned; Ser. No. 430,230, filed Jan. 2, 1974, now U.S. Pat. No. 3,988,511; Ser. No. 726,612, filed Sept. 27, 1976, now abandoned; Ser. No. 851,710, filed Nov. 15, 1977, now abandoned; and Ser. No. 895,356, filed Apr. 11, 1978, now U.S. Pat. No. 4,209,545.

This invention relates to a method of instantizing caseinate and to the resulting product wherein instantization is accomplished by the use of a small quantity, 25% or less and as little as 1% or less, of an instantized soya protein.

In my above-mentioned U.S. Pat. No. 3,988,511, there is described a process of instantizing a protein such as soya protein which is water insoluble and which is difficult to disperse in an aqueous medium to form a stable dispersion (an "instantized" product).

The term "instantizing" as used herein is intended to mean the process of converting a protein (for example soya bean protein or caseinate) which is water insoluble and which is difficult to disperse in water, into a form which is readily dispersible in water or other aqueous medium such as milk. An instantized protein can be added to water or other aqueous medium such as milk and mixed with a moderate degree of stirring (e.g., hand stirring and without high speed mixing as in a blender and/or the application of heat) to form a stable suspension that does not settle out or separate.

The process of instantizing described in my above-mentioned patent starts with a small amount (i.e., small compared to the weight of final product) of a substrate which may be a carbohydrate such as a sugar (e.g., sucrose) but which preferably is a small amount (similarly defined) of the protein which is to be instantized. To this substrate is added a surfactant which is acceptable as a food ingredient, such as lecithin or any of those described hereinafter, and the two ingredients (substrate and surfactant) are blended together. To the resulting pre-mix or core of substrate and surfactant is added a small quantity of the protein to be instantized and the resulting mixture again is blended. This process is repeated until the final product results. That is, the process is one of the incremental addition of a small quantity of the protein to be instantized to the blend or mixture resulting from the immediately preceding step, followed by thorough blending, and repetition until all of the protein that it is desired to instantize has been added.

Unless otherwise stated, where a product of the invention is described as having a specified (e.g., 95%) protein content, this refers to the commercial protein which itself may contain, for example, 5% of naturally occurring nonproteinaceous concomitants.

By this means a good instantized product results which, for example, can be added to water or milk at room temperature and stirred with ordinary hand stirring, as with a spoon, to produce a stable suspension which does not separate or stratify on standing. Among advantages of this process and product are the following: A high protein product containing very little (or no) added carbohydrate and containing very little surfactant can be produced. For example, a product containing 95 to 99.9 percent of protein, as little as 0.1 percent or less of surfactant and no carbohydrate can be produced.

As described in my copending application Ser. No. 895,356, now U.S. Pat. No. 4,209,545, instantized soya protein can be used to advantage to instantize caseinate. (By "caseinate" is meant sodium caseinate, calcium caseinate or mixtures of the two in any proportions.) For example to instantized soya protein made according to my U.S. Pat. No. 3,988,911 may be added, in increments, an equal weight of caseinate and the resulting product (a 50—50 mixture of soya protein and caseinate containing, for example, 1% of lecithin) is instantized.

There is a need for high caseinate products, e.g. such product containing more than 75% caseinate, preferably 90% or more of caseinate and less than 25%, preferably 10% or less of soya protein.

In accordance with my present invention such instantized mixture, i.e. mixtures of caseinate and soya protein containing more than 75% of caseinate and less than 25% of soya protein, are prepared by first providing an instantized soya protein and adding caseinate in small increments while blending each increment with the mass to which it is added before the next increment is added.

By such means instantized mixtures of (1) caseinate and (2) soya protein can be prepared which contain, for example, 25%, 22%, 20%, 15%, 10%, 5%, 1%, 0.5% and less of soya protein, the balance being caseinate. Thus high and even essentially 100% instantized caseinate products can be prepared very simply and inexpensively and which are instantized. The non-protein content of these products (other than non-proteinaceous concomitants which naturally occur in commercial soya protein and caseinate) may be as low as 0.01% or less.

By this means, a very desirable high casein food product is produced which can be mixed with water or milk and stirred manually with no great amount of effort and at room temperature, to produce an instantized product which is stable in the sense that phase separation does not occur to any substantial degree and to which other food substances may be added.

As specific examples of the method and product of the present invention, the following formulation and procedure are provided.

EXAMPLE 1 PRODUCTION OF INSTANTIZED SOYA PROTEIN

Four hundred pounds of soya protein were blended with lecithin in accordance with the procedure of my U.S. Pat. No. 3,988,511. The soya protein was a product of Central Soya Co. known as Promine D, containing about 90% of protein as determined by nitrogen analysis. Twenty-five pounds were added to 8 pounds of lecithin. [The lecithin was a product of Central Soya Co. known as 3 FUB (unbleached, 3× filtered.)] It contained about 65% phospholipids, the balance being naturally occurring vegetable oil, which is a natural and ordinary concomitant of commercial lecithin derived from soya beans. These two ingredients (soya protein and lecithin) were mixed in a ribbon blender to form a uniform mix or pre-blend. To this pre-blend were added 50 pounds of the soya protein and the mixture was blended. (This and subsequent blending steps were carried out in a larger ribbon blender.) The balance of the soya protein (except the last 25 pound increment) was added in increments of 50 pounds each, with blending at each stage.

EXAMPLE 2 PRODUCTION OF A 50—50 SOYA PROTEIN-CASEINATE BLEND

To the instantized soya protein of Example 1 were added 400 pounds of a mixture of equal parts by weight of sodium and calcium caseinates. This mixture was a commercial product of Western Dairy Products of San Francisco, Calif. known as No. 60. This mixture, as is typical of sodium and calcium caseinates and mixtures of the two, is very difficult to instantize. This caseinate was added in 50 pound increments, with thorough blending after each increment, to the blend of soya protein and lecithin. The blender was operated constantly during and after each addition of an increment of caseinate.

By this means a thoroughly and easily instantized protein was produced which can be used as is or as described in formulation of Example 2 of my copending application Ser. No. 895,356, now U.S. Pat. No. 4,209,545. However, in accordance with the present invention, further increments of caseinate are added with blending of each increment with the mass to which it is added before the next increment is added, thereby producing caseinate containing 80%, 90%, 95%, 98%, 99% and more caseinate according to the amount of caseinate that is added. Each of these products is instantized.

In the preferred procedure and in forming the instantized soya protein, a small portion of the soya protein is mixed with all of the surfactant to form a uniform blend of the surfactant and the soya protein which will form easily broken lumps on squeezing by hand; then to the resulting concentrate, core or starter is added a further small increment of the soya protein and mixing is continued until, again, a uniform blend is achieved which is not powdery or dusty and which will form easily broken lumps on squeezing by hand; and this procedure is repeated until all of the soya protein has been added. If desired, the surfactant may be added in increments during the first few steps but preferably all of the surfactant is added to and blended with the first small increment of soya protein. The initial mixing steps, which employ relatively small quantities of material, may be carried out advantageously in equipment of suitably small size. A ribbon blender is an advantageous type of equipment for this purpose. Such equipment is well known in the food processing industry. It employs a helical screw which mixes and moves the ingredients and it may have a double helical screw which moves the mixture back-and-forth.

Other forms of instantized soya protein instantized by other methods may be employed but soya protein instantized by the incremental procedure of my U.S. Pat. No. 3,988,511 is preferred.

It is permissible to use continuous techniques in which, after a concentrate, core or starter has been formed, protein is added continuously, but the incremental procedure described above is preferred. Also the surfactants, e.g. lecithin or any of the surfactants mentioned below may be dissolved in a volatile solvent such as dimethyl ether or ethanol and the solution may be sprayed gradually into the entire mass of soya protein while it is subjected to mixing, e.g. in a ribbon blender or an augur type of blender. However, the incremental method of my U.S. Pat. No. 3,988,511 is preferred.

The surfactant employed may be a natural product, such as lecithin or it may be a synthetic product. It may be nonionic, anionic or cationic, provided it is non-toxic and is soluble in a fatty oil. Examples of suitable surface-active agents are as follows: lecithin, hydroxylated lecithins, refined phospholipids, polyoxyethylene sorbitan fatty acid esters, sorbitan esters of fatty acids, propylene glycol monolaurate and monosterate, glycerol monostearate and mono-oleate, safflower monoglycerides, polyoxyethylene, nonyl phenol adducts, diethylene glycol monolaurate and mono-oleate; polyethylene glycol mono- and di-laurates, stearates and oleates; polyoxyethylene ethers; coconut, lauric and stearic diethanolamides; phosphotidyl choline mono- and di-glycerides, inositol phosphatides, cephalin fractions, sodium stearoyl-2-lactylate, di-octyl sodium sulfosuccinate, di-acetyl sodium sulfosuccinate and, of course, mixture of such surfactants.

The preferred surface-active agent is lecithin or a lecithin fraction. It is a natural product derived from such sources as soya bean and it is an approved food additive. As produced commercially, it contains an oil (soyabean oil when derived from soyabean) which provides the oily base that is desirable in the practice of the present invention. With other surface-active agents which are synthetic and dry, it is desirable to dissolve them in oil, and even with those which are liquid it may be desirable to dissolve them in oil, e.g., to provide a 1 to 50% solution in an oil such as vegetable oil, e.g., coconut oil, cottonseed oil, cocoa butter, sesame oil, etc. Volatile solvents such as alcohol and ether may be employed but nonvolatile oils are preferred because they do not require evaporation.

The surfactant is used in sufficient quantity (which may be only 0.8, 0.5 or 0.1 percent or less based on final product) to instantize the protein blend. More may be used for dietary reasons but in most cases it is preferred to use a very small amount, e.g., 0.1 to 2%. As noted in Example below, as little as 0.01% of surfactant in the final product may suffice.

The ratio of sodium to calcium caseinate may also vary widely, e.g., from 100% of sodium caseinate to 100% of calcium caseinate. Preferably the proportions are about 25 to 75 parts by weight of one such caseinate to about 75 to 25 parts by weight of the other caseinate.

The following examples will serve further to exemplify the practice of my invention. Example 3 is carried forward from Example 2 of my copending application Ser. No. 895,356, now U.S. Pat. No. 4,209,545 but modified as indicated by increasing the quantity of caseinate.

EXAMPLE 3

To prepare a 50—50 blend of soya-caseinate, 400 pounds of instantized soya protein prepared as in Exaxple 1 (containing 8 pounds of lecithin) were mixed with 400 pounds of sodium/calcium caseinate (same as in Example 2) by adding the caseinate in 50 pound increments with thorough blending of each increment with the material to which it was added before the next increment was added. To the resulting 50—50 soya-caseinate blend is added 2,000 pounds of caseinate in small increments with blending of each increment before the next increment is added, resulting in a soya-caseinate product containing more than 88% caseinate. Then 150 pounds of whey powder were added in increments not exceeding 50 pounds with thorough blending of each increment before adding the next increment. (The entire quantity of whey power may be added at once but incremental addition is preferred.)

To the resulting blend were added a balanced mixture of amino acids resulting from hydrolysis of proteins, enzymes, flavor and egg powder, the quantity of each such ingredient being quite small but sufficient to bring the total weight to 3,000 pounds and to provide a good dietary balance which is instantized and capable of dispersing in aqueous media such as fruit juices.

EXAMPLE 4.

(a) Production of 50—50 soya-caseinate mixture 1,000 grams of soya protein instantized by the procedure of Example 1 above and containing 1% lecithin were added to a Hobart blender. To this mass while the blender was operating were added 1,000 grams of caseinate as in Example 2, in 100 gram portions with blending of each portion with the mass to which it was added before the next increment was added. An instantized 50—50 soya protein-caseinate mixture resulted.

(b) To 100 grams of the 50—50 mixture were added 5,000 grams of the caseinate of Example 2, at first in 100 gram increments, later in 300 and then 400 gram increments, with blending of each increment before the next was added. An instantized product containing 2% soya protein and 98% caseinate resulted.

(c) 1,000 grams of this 2% soya, 98% caseinate mixture were taken and to it were added 1,000 grams of the same caseinate in 100 gram, then in 200 gram increments with blending of each increment before the next increment was added.

All of these operations were carried out in a Hobart blender. The final product contained only 1% of soya protein and 0.01% of lecithin, yet it was instantized, i.e., it could be dispersed readily as by hand stirring at room temperature in milk to form a stable dispersion without significant phase separation.

In view of the difficulties encountered heretofore in instantizing caseinate, e.g. the complex procedure of Palmer U.S. Pat. No. 3,728,127, it is surprising that so little instantized soya protein and so very little surfactant will instantize caseinate.

As described in my patent application Ser. No. 924,953, filed July 17, 1978 and entitled "INSTANTIZED PROTEIN PRODUCT CONTAINING SYRUP AND METHOD OF MAKING SAME", now abandoned, the instantized soya protein-caseinate product of my application Ser. No. 895,356, now U.S. Pat. No. 4,209,545 may be advantageously used in conjunction with saccharide concentrates such as date concentrate, molasses from sugar cane, black strap molasses, corn syrup, pineapple concentrate, malt syrup, milk syrup, carob syrup, etc.

In general these syrups and concentrates may be described as saccharide concentrates, which are viscous solutions in water of lower saccharides, chiefly mono- and di-saccharides such as glucose, fructose, dextrose, sucrose, xylose, maltose, etc.

These saccharide concentrates contain in excess of 50% by weight of saccharide, usually considerably more.

In accordance with the present invention, the proportion of soya protein in the soya protein-caseinate blend is less than 25%, e.g. 10% or less and as little as 1% or less, the balance being caseinate. That is to say, whereas in my abandoned patent application Ser. No. 924,953 instantized soya protein/caseinate blends having high (e.g. 25 to 75%) proportions of soya protein were blended with saccharide concentrates, in accordance with the present invention the soya protein/caseinate blend contains less than 25% of soya protein.

The following example is taken from my abandoned application Ser. No. 924,953 and is modified to describe its adaptation to the present invention.

EXAMPLE 5 PREPARATION OF INSTANTIZED PROTEIN-SYRUP BLEND

The formulation was as follows (parts by weight):

| | |
|---|---|
| (1) Instantized soya protein of Example 1 | 325 |
| (2) Sodium/calcium caseinate mixture of Example 2 | 325 |
| (3) Date concentrate | 352 |
| (4) Hydrolyzed protein, flavoring agent, anti-caking agent, thickening agent | 32 |

The date concentrate was a water extract of date meat concentrated about 70° Brix by evaporation under vacuum.

The hydrolyzed protein (a source of amino acids), the anti-caking agent (Syloid, a product of Davison Chemical Company, and which is a silica and a well known anti-caking agent) and the thickening agent (a xanthan gum) were optional ingredients, although advantageous. The procedure used was as follows: The instantized soya protein was placed in a ribbon blender; the caseinate was added intermittently in 50 pound increments while the blender was operating; then the date concentrate was poured in slowly; then the xanthan gum was added followed by the amino acids and finally by the anti-caking agent. The blender was meanwhile operating and its operation was continued until a uniform blend was obtained.

This procedure may be modified in accordance with the present invention by using the same amount of instantized soya protein but blending it with a larger quantity of caseinate sufficient to produce an instantized soya protein/caseinate blend to contain 10%, 5% or 1% of soya protein.

Proportions of the essential ingredients (i.e., of instantized protein and saccharide concentrate) may be as follows (parts by weight):

Instantized soya protein/caseinate: 60 to 75
Saccharide concentrate: 25 to 40

The saccharide concentrate is preferably present in quantity sufficient to impart a sweet taste but not so much as to make the product mushy. That is, the product is preferably a dry product, not in the sense that it contains no moisture, but in the sense that it has a dry feel and can be poured readily. However, as noted below, the product will form lumps when squeezed by hand and it is not dusty. As described in my application Ser. No. 924,953, the instantized protein may be an instantized soya protein or a blend of instantized soya protein and caseinate (Na, Ca or Na/Ca); when a soya proteincaseinate blend is used the soya protein and the caseinate may be present in any proportions, e.g., 10 to 90% by weight of soya protein and 90 to 10% caseinate; preferably, the proportions are about 25 to 75 parts of soya protein and about 75 to 25 parts of caseinate; and the ratio of sodium to calcium caseinate may also vary widely, e.g., from 100% of sodium caseinate to 100% of calcium caseinate; preferably about 25 to 75 parts by weight of one such caseinate to about 75 to 25 parts by weight of the other caseinate.

It will therefore be apparent that new and useful instantized food preparations have been provided.

I claim:

1. Instantized mixture of soya protein and caseinate containing more the 75% caseinate and less than 25% but not less than about 0.5% soya protein based on the quantity of soya protein and caseinate, the caseinate being selected from the group of sodium casinate, calcium caseinate and mixtures of the two, said instantized soya protein being the product of an incremental process in which a small quantity of soya protein is blended with a surfactant and further increments of soya protein small in comparison to the total soya protein are blended, in succession, with previous blends with thorough blending at each step before the next increment is added.

2. The instantized mixture of claim 1 wherein the surfactant is lecithin.

3. The instantized mixture of claim 1 wherein the proportion of caseinate is not less than 90%.

4. The instantized mixture of claim 1 wherein the proportion of caseinate is not less than 98%.

5. The instantized mixture of claim 1 wherein the proportion of caseinate is not less than 99%.

6. A method of instantizing a caseinate selected from the group consisting of sodium caseinate, calcium caseinate and mixtures of the two wherein a quantity of instantized soya protein is provided, a quantity of caseinate which is small in comparison to the final product, is blended with the instantized soya protein, and further such small quantities of caseinate are added in steps to the previous blend with blending to each added quantity before the next quantity is added, the total quantity of caseinate so added and blended exceeds 75% based on combined soya protein and caseinate, the instantized soya protein being used in an amount not less than about 0.5% of the resulting caseinate-soya protein mixture and being the product of an incremental process in which a small quantity of soya protein is blended with a surfactant and further increments of soya protein small in comparsion to the total soya protein are blended, in succession, with previous blends with thorough blending at each step before the next increment is added.

7. The method of claim 6 wherein the total quantity of caseinate is such as to result in a blend containing not less than 90% caseinate.

8. The method of of claim 7 wherein the total quantity of caseinate is such as to result in a blend containing not less than 98% caseinate.

9. The method of claim 8 wherein the total quantity of caseinate is such as to result in a blend containing not less than 99% caseinate.

* * * * *